March 10, 1936.  C. J. COBERLY  2,033,568
CUTTING TORCH TIP WITH NONCIRCULAR ORIFICE
Filed Dec. 12, 1930
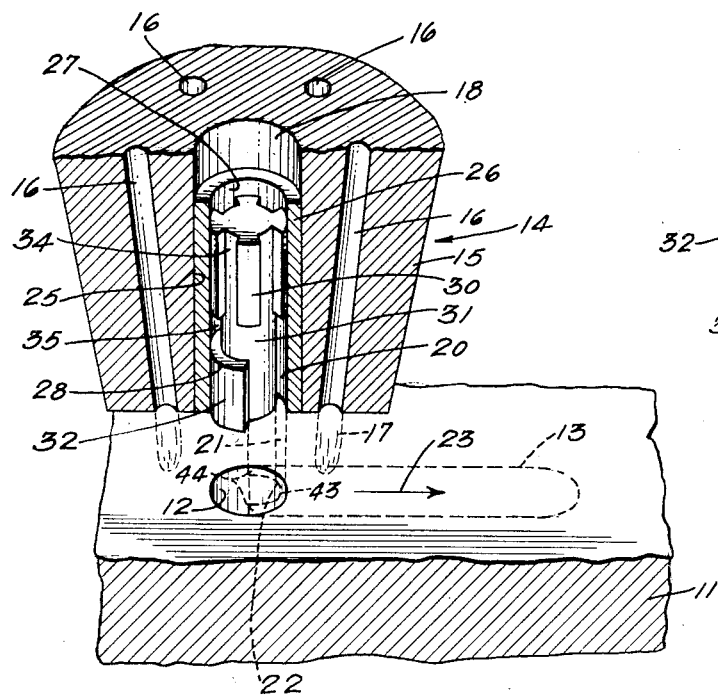
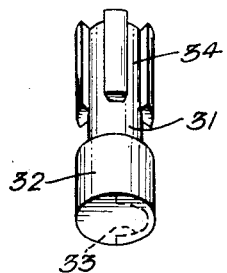
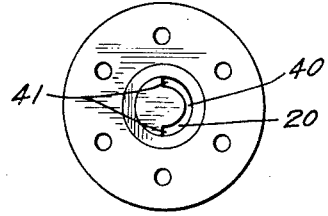 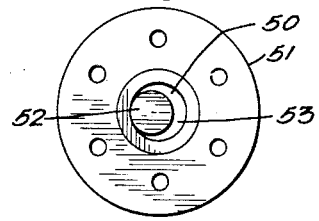 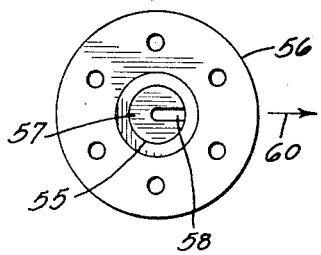
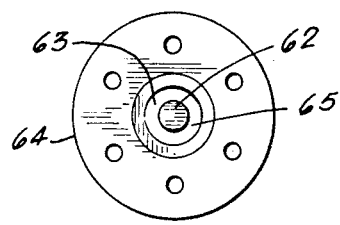
INVENTOR:
CLARENCE J. COBERLY,
BY
ATTORNEY.

Patented Mar. 10, 1936

2,033,568

UNITED STATES PATENT OFFICE 2,033,568

CUTTING TORCH TIP WITH NONCIRCULAR ORIFICE

Clarence J. Coberly, Huntington Park, Calif., assignor to Kobe, Inc., Huntington Park, Calif., a corporation of California Application December 12, 1930, Serial No. 501,832

5 Claims. (Cl. 158—27.4)

My invention relates to the art of cutting slots in metal by the use of a jet of cutting-gas such as oxygen, and relates particularly to means whereby the cost of cutting slots may be reduced and whereby the cutting effect may be improved.

The invention will be hereinafter disclosed in connection with the cutting of slots in metal plates for the reason that at the present time the principal utility of the invention is in the manufacture of slotted pipe or well screen having its principal use as strainers or perforated liners for oil wells. This slotted pipe or screen is made by cutting slots in the wall of a metal pipe, so that openings are thereby formed through which fluids may enter the interior of the screen from the earth formation in which the screen is set. The gage or width of the slots cut in a screen pipe varies in accordance with the characteristics of the materials constituting the formation from which fluids such as oil and gas are to be removed.

It is an object of my invention to provide a cutting torch tip which will cut a slot of desired width with a much smaller quantiy of oxygen than is employed in the ordinary form of cutting torch tip. This saving in oxygen is of considerable importance for the reason that the reduction in the quantities of cutting-gas required may be as high as 80%.

A further object of the invention is to provide a method of cutting a slot in a metal plate or metal body by use of a cutting jet of non-circular cross section.

Further objects and advantages of the invention will be brought out in the following part of the specification.

Referring to the drawing, which is for illustrative purposes only,

Fig. 1 is a fragmentary sectional view showing a cutting torch tip construction embodying my invention, and a plate in which a slot is to be cut.

Fig. 2 is a bottom plan view of the cutting torch tip shown in Fig. 1.

Fig. 3 is a perspective elevation of the plug or orifice forming member of my invention, previous to the forming of channels or passages therein.

Figs. 4, 5, and 6 show alternative forms of my invention.

In Fig. 1 of the drawing I show a portion of a metal plate 11 in which a starting hole 12 has been drilled preparatory to the cutting of a slot in the plate 11, as indicated by the dotted line 13. Disposed in axially circularized position relative to the starting hole 12 is a cutting torch tip 14 which, in accordance with standard practice, includes a body 15 having a plurality of passages 16 therein through which a combustible gas mixture, such as oxygen and acetylene may be conducted to feed heating flames 17, indicated by dotted lines. The cutting torch tip has a cutting-gas passage 18 through which the cutting-gas is carried to a discharge orifice 20, this discharge orifice, as shown in Fig. 2, being of arcuate form and extending through an arc of substantially 180°. From this discharge orifice 20 a cutting jet 21 issues, such jet 21 being of arcuate form, as clearly indicated by dotted lines 22, and passing through the rightward portion of the starting hole 12. When the heating flames 17 have heated the walls of the plate 11 surrounding the starting hole 12 to such an extent that combustion of the metal of the plate 11 will occur in the presence of the cutting-gas of the cutting jet 21, the cutting torch tip 14 is moved in the direction of an arrow 23 along the path defined by the dotted lines 13 so as to cut a slot in the plate 11 of width and length demarcated by the dotted lines 13.

It will be noted that my new cutting torch tip and method of cutting slots in metal does not employ a discharge orifice or a jet of cutting-gas of full circular cross section, but instead thereof, the discharge orifice of the cutting torch tip is so formed that the cutting jet issuing therefrom will direct gas against the metal which is to be removed by combustion, and against no other part of the metal of the plate 11. I have found that a substantial portion of the gas used in cutting jets of circular cross section is wasted, as it is only the forward portion of the cutting jet that is utilized in the cutting operation. In other words, to cut a slot as indicated by the dotted lines 13, the cross section of a gas jet necessary for cutting such slot is indicated by the dotted lines 22, as the dotted lines 22 define the forward portion of a circular area lying adjacent to the metal which must be cut away in order to form the slot 13. The arcuate area of the jet 21, indicated by dotted lines 22, is substantially 20% of the circular area of the starting hole 12 which has the same diameter as the width or gage of the slot indicated by the dotted lines 13; therefore, by using a jet 21 of non-circular cross section instead of a jet corresponding in cross section to the starting hole 12, I accomplish a saving in cutting-gas of approximately 80%.

In Figs. 1, 2 and 3 I show a simple method and structure for forming a non-circular discharge orifice 20 which will deliver a cutting jet of desired cross section, such as the cutting jet 21. In the lower end 25 of the cutting-gas passage 18 a sleeve 26 is inserted having a bore or opening 27 therethrough, selected with respect to the width of the slot to be cut. A plug 28, inserted in the opening 27 of the sleeve 26, is so formed that the opening 27 through the sleeve 26 is obstructed with the exception of the orifice 20. The plug 28 is formed from a body having an inner body portion 30, an inter-connecting portion 31 of reduced diameter and a lower or outer body portion 32, the diameters of the portions 30 and 32 corresponding to the diameter of the opening 27. To form the orifice 20 a portion of the outer body portion 32 indicated by dotted lines 33 is cut away so that when the plug 28 is inserted in the opening 27 the arcuate discharge orifice 20 will be formed between the outer body portion 32 and the lower wall of the sleeve 26. A plurality of longitudinal slots 34, cut in the inner body portion 30, provide passages through which cutting-gas may flow from the passage 18 into an annular space 35 surrounding the inter-connecting portion 31 to the orifice 20. The inner body portion 30 provides a means for holding the outer body portion 32 in proper position at the lower end of the opening 27 through the sleeve 26.

The outer body portion 32 is so cut that the width of the central portion 40 of the orifice 20 will be less than the width of the ends 41 of the orifice 20, in order that a greater volume of gas will pass downwardly at the sides of the jet 21, in accordance with my findings that the amount of cutting-gas required at the front portion 43 of the cutting jet is less than the amount of gas required at the sides 44 thereof. In the form of my invention shown in Fig. 4, the lower end of a gas passage 50 of a torch tip 51 is obstructed by a cylindrical plug 52, of smaller diameter, set eccentrically in the opening 50 so as to leave a crescent-shaped orifice 53 which approximates the arcuate shape of the orifice 20 shown in Figs. 1 and 2. Although the orifice 53 would not accomplish as high cutting efficiency as the orifice 20, it may be employed with satisfactory results and with a very appreciable saving in cutting-gas.

In Fig. 5 the lower or outer end of a gas passage 55 of a cutting torch tip 56 is fitted with a plug or obstructing wall 57 having a narrow slot cut therein to form an orifice 58. This construction is employed where a very narrow slot is to be cut. In cutting such slot, the torch tip 56 is moved relative to the slot in the direction indicated by an arrow 60, so that the cross section of the orifice 58 will extend in the direction of the slot to be cut. For cutting very narrow slots through relatively thick plate, this orifice construction provides a larger quantity of gas than can be obtained from a small diameter drilled hole. Where a drilled hole of a diameter corresponding to a narrow slot is employed, excessive pressure must be resorted to in order to carry the cutting jet entirely through the metal plate, such excessive pressure causing the gas jet to expand so as to cut a slot having a gage considerably larger than the diameter of the drilled hole forming the orifice. The slot 58, shown in Fig. 5, permits the quantity of gas to be built up without necessity of using high pressures and therefore without increasing the width of the cutting jet.

The alternative shown in Fig. 6 indicates how a concentric plug 62 may be placed in a discharge passage 63 of a torch tip 64, thereby forming a completely annular orifice 65. In this practice of my invention the gas actually used for slot cutting purposes is that proportion passing through one side or half of the annular orifice 65, the other half of the gas being wasted. There is, however, a saving of gas for the reason that the plug 62 obstructs the central portion of passage 63 and prevents a flow of gas through a cross sectional area represented by the plug 62.

Although I have herein shown practical forms of my invention, it is recognized that some of the parts illustrated may be replaced by other parts adapted to accomplish substantially identical results in an equivalent manner; therefore, it is to be understood that the invention is not limited to the details disclosed but should be accorded the full scope of the following claims.

I claim as my invention:

1. A cutting torch tip of the character described, comprising: a body having walls forming a cutting-gas passage, and means at the discharge end of said cutting-gas passage forming an orifice of arcuate cross section, said discharge orifice being of greater width at its ends than at its center.

2. A tip for a torch having passages for heating-gases and a passage for oxygen, the discharge orifice of the oxygen passage being of arcuate cross section and of greater width at its ends than at its center.

3. A torch tip comprising: a body portion having a central cutting-gas passage and a plurality of surrounding heating-gas passages; and a plug member disposed in the discharge end of said cutting-gas passage, said plug having enlarged inner and outer end portions and a reduced intermediate portion, the inner end portion having longitudinal grooves in its periphery providing gas passages communicating with the space about the reduced portion, the outer end having a portion of its periphery cut away to form a cutting-gas orifice of arcuate cross section, said orifice being of greater width at the ends than at the center.

4. A cutting torch tip of the character described, comprising: a body having a cutting-gas passage extending therethrough and terminating in a semi-annular discharge orifice which is of greater width at its ends than at its center.

5. A tip for a torch having passages for heating-gases and a passage for cutting-gas, said cutting-gas passage having a restricting device positioned therein adjacent the discharge end thereof which forms a cutting-gas discharge orifice of arcuate cross-section with its end portions wider than the center portion.

CLARENCE J. COBERLY.